US012683844B2

(12) United States Patent
Lourdu Raja et al.

(10) Patent No.: US 12,683,844 B2
(45) Date of Patent: Jul. 14, 2026

(54) METHOD TO USE COMMON SIGNAL CHAIN FOR MULTIPLE NB-IOT STANDALONE CELLS

(71) Applicant: Mavenir Systems, Inc., Richardson, TX (US)

(72) Inventors: Charles Santhosam Lourdu Raja, Bangalore (IN); RadhaKrishna Arvapally, Bangalore (IN)

(73) Assignee: Mavenir Systems, Inc., Richardson, TX (US)

( * ) Notice: Subject to any disclaimer, the term of this patent is extended or adjusted under 35 U.S.C. 154(b) by 668 days.

(21) Appl. No.: 18/181,633

(22) Filed: Mar. 10, 2023

(65) Prior Publication Data
US 2023/0300013 A1 Sep. 21, 2023

(30) Foreign Application Priority Data
Mar. 17, 2022 (IN) .............................. 202221014871

(51) Int. Cl.
*H04L 27/26* (2006.01)

(52) U.S. Cl.
CPC ...... *H04L 27/2613* (2013.01); *H04L 27/2605* (2013.01)

(58) Field of Classification Search
CPC .......................... H04L 22/2613; H04L 27/2605
See application file for complete search history.

(56) References Cited

U.S. PATENT DOCUMENTS 11,265,726 B2 3/2022 Sui et al.

OTHER PUBLICATIONS

3rd Generation Partnership Project (3GPP) Technical Specification (TS) 36.331 v16.7"3rd Generation Partnership Project; Technical Specification Group Radio Access Network; Evolved Universal Terrestrial Radio Access (E-UTRA); Radio Resource Control (RRC); Protocol specification Release 16" 3GPP, France, Dec. 2021.
Partial European Search Report for corresponding European patent application EP 23162317.4, 18 pages, dated Jul. 31, 2023.
Nokia et al: "3GPP TSG-RAN WG4 Meeting #82bis-Channel Raster for Multiple Standalone NB-IOT Carriers",3GPP Draft; R4-1703804, 3rd Generation Partnership Project (3GPP), Cedex ; France, Apr. 3, 2017.

(Continued)

*Primary Examiner* — Samina F Choudhry
(74) *Attorney, Agent, or Firm* — Ruggiero McAllister & McMahon LLC

(57) ABSTRACT

A method of processing multiple consecutive Narrowband Internet of Things (NBIOT) cells by a Radio Access Network (RAN) of a mobile network includes one of: a)1) shifting at least one first NBIOT cell relative to an adjacent second NBIOT cell to align all sub carriers of the first and second NBIOT cells to be mutually orthogonal; and a)2) using a first single fast Fourier transform (FFT) or first single inverse fast Fourier transform (iFFT) by the RAN to process both the first and second NBIOT cells; or b1) for a sequence of NBIOT cells, every third NBIOT cell is grouped into a single group, wherein all sub carriers of the NBIOT cells in the single group are mutually orthogonal; and b2) using the first single FFT or the first single iFFT by the RAN to process multiple NBIOT cells in the single group formed from the every third NBIOT cell.

4 Claims, 12 Drawing Sheets

(56) References Cited

OTHER PUBLICATIONS

Wang et al. "A Primer on 3GPP Narrowband Internet of Things (NB-IoT)", Internet Citation, Jun. 13, 2016 (Jun. 13, 2016), XP002772811,URL:https://arxiv.org/ftp/arxiv/papers/1606/1606.04171.pdf.

Extended European Search Report for corresponding European patent application EP 23162317.4, 16 pages, dated Nov. 10, 2023.

Myung et al "Single Carrier FDMA for Uplink Wireless Transmission", IEEE Vehicular Technology Magazine, Sep. 2006, vol. 1., No. 3 (pp. 30-38) IEEE; US.

METHOD TO USE COMMON SIGNAL CHAIN FOR MULTIPLE NB-IOT STANDALONE CELLS

BACKGROUND OF THE INVENTION

The present disclosure relates to Radio Access Network (RAN) for 4G- and 5G-based mobile networks, and relates more particularly to interfaces (e.g., air and/or physical interfaces) for Narrowband Internet of Things (NBIOT) cells.

Currently, when multiple NBIOT standalone cells are served by an NBIOT Evolved Node B (eNodeB) of a RAN, at least two issues must be addressed. First, the NBIOT eNodeB needs to utilize multiple digital filters to avoid interference between consecutive NBIOT standalone cells. Second, when there are multiple (e.g., number N) consecutive NBIOT standalone cells, each NBIOT standalone cell is processed independently, i.e., the RAN needs to use N downlink (DL) signal chains and N uplink (UL) signal chains (e.g., utilizing Fast Fourier Transform (FFT) and/or Inverse Fast Fourier Transform (iFFT)). These conventional solutions require substantial capital expenditures and heightened complexity of RAN operation.

FIG. 1 is a diagram illustrating an example NBIOT standalone cell 1001 of 200 KHz containing i) 12 sub carriers occupying 180 KHz and ii) 10 KHz guard on the two ends of the cell. As shown in FIG. 1, all 12 sub carriers are orthogonal to each other, i.e., at the peak of a given sub carrier, all other 11 subcarriers are zero, and vice versa. FIG. 2 is a diagram illustrating an example embodiment of two consecutive NBIOT standalone cells 2001 and 2002 each spanning 200 KHz and each containing 12 sub carriers. As can be seen in FIG. 2, within each NBIOT standalone cell 2001 or 2002, the 12 sub carriers of the respective cell are orthogonal to each other, but the subcarriers of NBIOT standalone cell 2001 are not orthogonal to the subcarriers of neighboring NBIOT standalone cell 2002, which leads to interference between the NBIOT standalone cells 2001 and 2002. In this case, the conventional solution is for the RAN to use filters between NBIOT standalone cells 2001 and 2002. In addition, since the subcarriers of the cell 2001 are not aligned with the subcarriers of the cell 2002, the RAN can't use the same FFT/iFFT for multiple NBIOT standalone cells.

Therefore, there is a need for a solution that optimizes interference reduction while reducing cost and complexity of RAN operation when multiple NBIOT standalone cells are served by an NBIOT eNodeB.

SUMMARY OF THE INVENTION

According to an example embodiment of the present disclosure, a method is presented in which multiple NBIOT cells are aligned to make all sub carriers across cells to be mutually orthogonal.

According to an example embodiment of the present disclosure, one of: i) at least one first NBIOT cell is shifted relative to an adjacent second NBIOT cell to align all sub carriers of the first and second NBIOT cells to be mutually orthogonal; or ii) for a sequence of NBIOT cells, every third NBIOT cell is grouped into a single group, wherein all sub carriers of the NBIOT cells in the single group are mutually orthogonal. A single fast Fourier transform (FFT) or inverse fast Fourier transform (iFFT) can be used, e.g., by a radio access network (RAN), to process one of i) both the first and second NBIOT cells, or ii) multiple NBIOT cells in the single group formed from every third NBIOT cell.

According to an example embodiment of the present disclosure, a method is presented in which, for two sequential and adjacent NBIOT standalone cells, the second NBIOT standalone cell following the first NBIOT standalone cell is left-shifted relative to the first NBIOT standalone cell by 5 KHz to make all subcarriers of the first and second NBIOT standalone cells to be mutually orthogonal.

According to an example embodiment of the present disclosure, in the case of two sequential and adjacent NBIOT standalone cells for which the second NBIOT standalone cell following the first NBIOT standalone cell is left-shifted relative to the first NBIOT standalone cell by 5 KHz, a method is presented in which an extra (e.g., 131 subcarrier is provided in the common guard region.

According to an example embodiment of the present disclosure, a method is presented in which, for three sequential and adjacent NBIOT standalone cells, the following relative shifts for the cells are provided: the first NBIOT standalone cell is right-shifted relative to the second NBIOT standalone cell by 5 KHz, and the third NBIOT standalone cell is left-shifted relative to the second NBIOT standalone cell by 5 KHz to make all subcarriers of the first, second and third NBIOT standalone cells to be mutually orthogonal. In this example embodiment, the following configurations for the guard regions are provided: the combined guard region between the first and second NBIOT standalone cells is 15 KHz; and the combined guard region between the second and third NBIOT standalone cells is 15 KHz.

According to an example embodiment of the present disclosure, the above-described configurations for the set of three sequential and adjacent NBIOT standalone cells can be repeated to provide six sequential and adjacent NBIOT standalone cells. In this example embodiment, the combined guard region between the third NBIOT standalone cell and the fourth NBIOT standalone cell is 30 KHz.

According to an example embodiment of the present disclosure, a method is presented in which, for three sequential and adjacent NBIOT standalone cells, the following configurations for the cells are provided: the first NBIOT standalone cell is right-shifted relative to the second NBIOT standalone cell by 5 KHz, and the third NBIOT standalone cell is left-shifted relative to the second NBIOT standalone cell by 5 KHz. In this example embodiment, an extra (e.g., 13th) subcarrier is provided in the combined guard regions i) between the first and second NBIOT standalone cells, and ii) between the second and third NBIOT standalone cells.

According to an example embodiment of the present disclosure, the above-described configurations for the set of three sequential and adjacent NBIOT standalone cells containing an extra subcarrier in the combined guard region between two adjacent NBIOT standalone cells can be repeated one or more times to provide, e.g., six sequential and adjacent NBIOT standalone cells. In this example embodiment, the combined guard region between the third NBIOT standalone cell and the fourth NBIOT standalone cell is 15 KHz.

According to an example embodiment of the present disclosure, for the above-described configurations for the six sequential and adjacent NBIOT standalone cells containing extra (e.g., 13th) subcarriers in the combined guard regions, e.g., i) between the first and second NBIOT standalone cells, and ii) between the second and third NBIOT standalone cells, a further extra (e.g., 14th) subcarrier is provided between the third and fourth NBIOT standalone cells.

According to an example embodiment of the present disclosure, a method is presented in which a single lower physical layer (L-Phy) is utilized for multiple NBIOT standalone carriers.

According to an example embodiment of the present disclosure, a method is presented in which the same fast Fourier transform (FFT) and/or inverse fast Fourier transform (iFFT) can be used for every third NBIOT standalone cell.

According to an example embodiment of the present disclosure, a method is presented in which the same fast Fourier transform (FFT) and/or corresponding inverse fast Fourier transform (iFFT) is used by the RAN for processing every third NBIOT standalone cell. In this example embodiment, at least one of the following configurations is provided for a sequence of NBIOT standalone cells sequentially positioned starting on the left: i) a first set of NBIOT standalone cells having sequence position numbers with quotient-1 of modulo-3 operation is processed by the RAN using at least one of a first FFT and a corresponding first iFFT; ii) a second set of NBIOT standalone cells having sequence position numbers with quotient-2 of modulo-3 operation is processed by the RAN using at least one of a second FFT and a corresponding second iFFT; and/or iii) a third set of NBIOT standalone cells having sequence position numbers with quotient-0 of modulo-3 operation is processed by the RAN using at least one of a third FFT and a corresponding third iFFT.

DETAILED DESCRIPTION OF THE INVENTION

Figure 1:
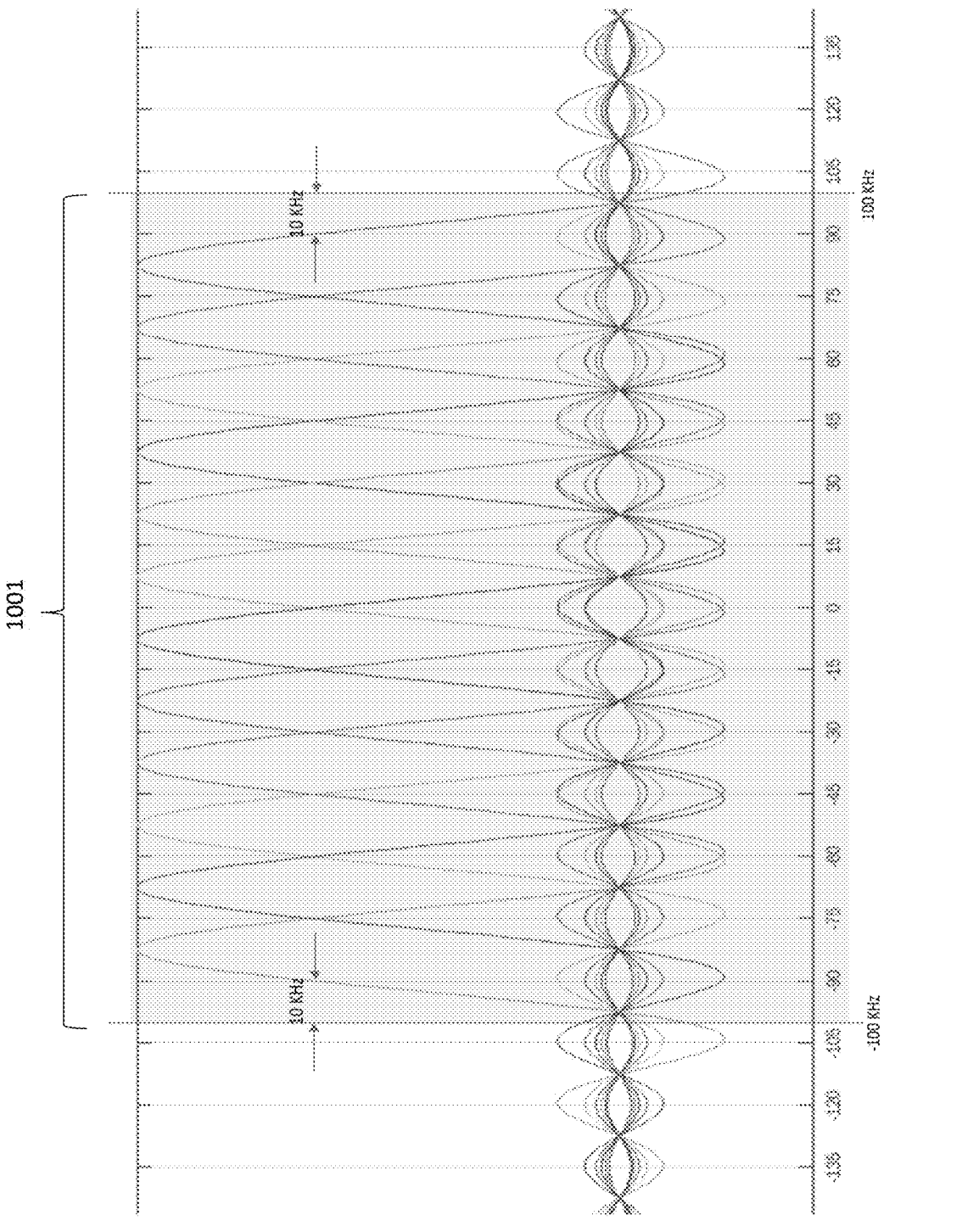
FIG. 1 is a diagram illustrating an example embodiment of an NBIOT standalone cell of 200 KHz with 12 sub carriers.
Figure 2:
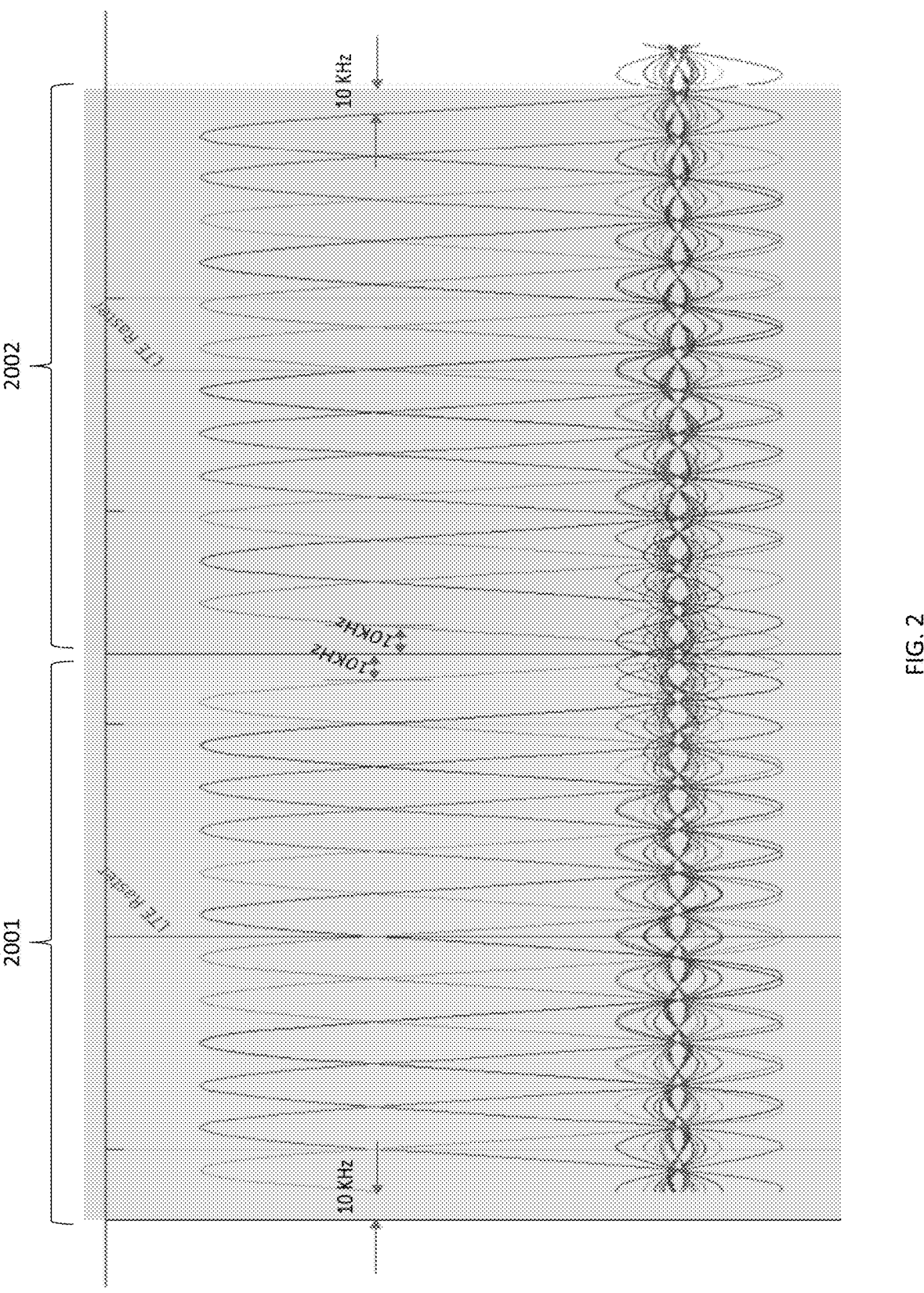
FIG. 2 is a diagram illustrating an example embodiment of two consecutive NBIOT standalone cells each spanning 200 KHz with 12 sub carriers.
Figure 3:
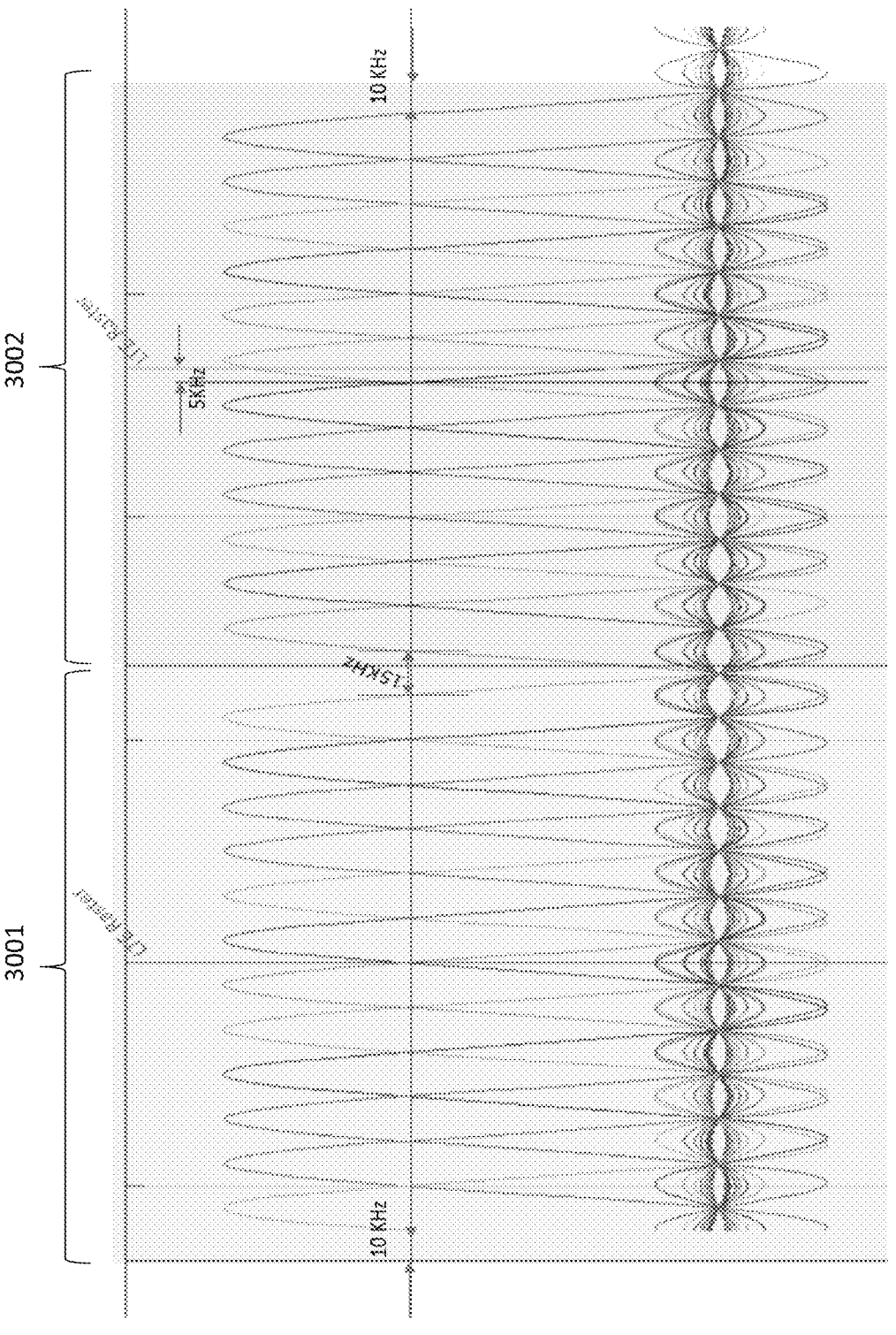
FIG. 3 is a diagram illustrating an example embodiment of two consecutive NBIOT standalone cells with the second cell being left-shifted by 5 KHz.

According to an example embodiment of the present disclosure, a method is presented in which, for at least two sequential and adjacent NBIOT standalone cells, the second NBIOT standalone cell following the first NBIOT standalone cell is left-shifted relative to the first NBIOT standalone cell by 5 KHz to make all subcarriers of the first and second NBIOT standalone cells to be mutually orthogonal. This example embodiment is illustrated in FIG. 3, which shows two consecutive NBIOT standalone cells 3001 and 3002 each spanning 200 KHz and each containing 12 sub carriers, with the second NBIOT standalone cell 3002 left-shifted by 5 KHz, resulting in a −5 KHz raster offset for the second NBIOT standalone cell 3002 (the raster offset will be explained in further detail in connection with FIGS. 4 and 5). As can be seen from FIG. 3, all 24 subcarriers of both NBIOT standalone cells 3001 and 3002 are mutually orthogonal, which enables the RAN to use the same FFT and/or iFFT for both NBIOT standalone cells 3001 and 3002.

Figure 4:
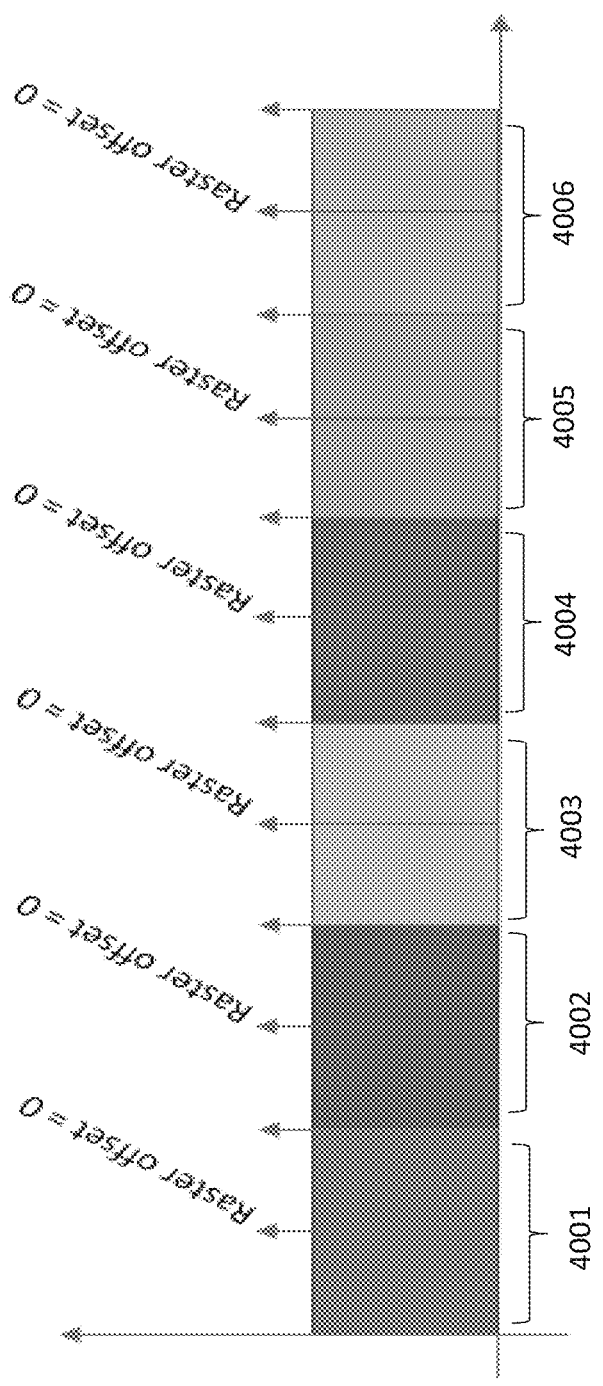
FIG. 4 is a diagram illustrating an example embodiment of six consecutive, equally spaced NBIOT cells with zero raster offset.
Figure 5:
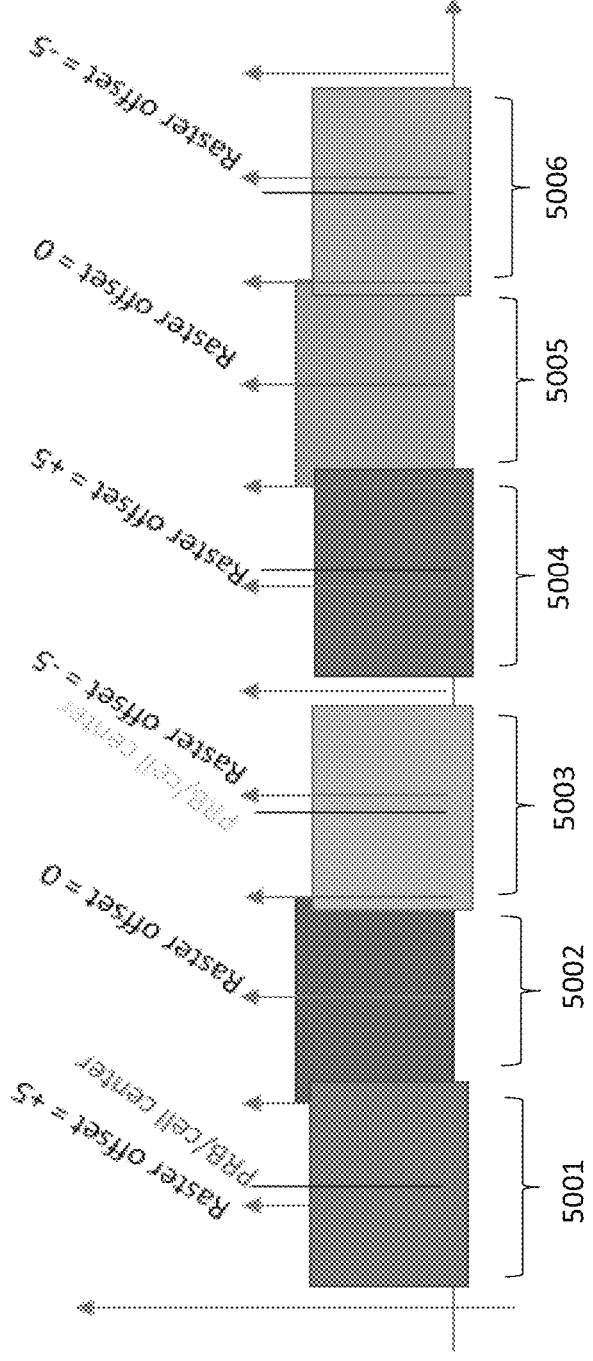
FIG. 5 is a diagram illustrating an example embodiment of six consecutive NBIOT cells with one of zero, +5 KHz or −5 KHz raster offset.

A comparison of FIGS. 4 and 5 illustrates the raster offset resulting from the 5 KHz shifting of selected NBIOT standalone cells. FIG. 4 shows six equally spaced (e.g., each 200 KHz) NBIOT cells 4001-4006 (each NBIOT standalone cell is represented by a box), with all NBIOT cells 4001-4006 having zero raster offset, as is the case in conventional arrangement of NBIOT cells. In contrast, FIG. 5 shows six NBIOT cells 5001-5006 which are each arranged with a 5 KHz shift relative to at least one adjacent cell, in accordance with an example embodiment of the present disclosure. As shown in FIG. 5, NBIOT cells 5002 and 5005 are placed with 0 raster offset (the center of the cell, or physical resource block (PRB), has not shifted relative to the original position); NBIOT cells 5001 and 5004 are placed with +5 KHz raster offset (the center of the cell or PRB has shifted 5 KHz to the right of the original position); and NBIOT cells 5003 and 5006 are placed with −5 KHz raster offset (the center of the cell or PRB has shifted 5 KHz to the left of the original position). It should be noted that the NBIOT cell 5004 has shifted 5 KHz to the right of the original position of the NBIOT cell 5003 (and has right-shifted 10 KHz in total relative to the NBIOT cell 5003). In the configuration shown in FIG. 5, all the subcarriers in the six NBIOT cells 5001-5006 are aligned, and therefore all six NBIOT cells 5001-5006 can be processed using the same FFT and/or the same iFFT blocks in the RAN. In addition, the configuration shown in FIG. 5 eliminates the need for digital filters between the adjacent NBIOT cells. Although 6 NBIOT cells are shown in FIG. 5, the alignment of the subcarriers is applicable to the group of first three NBIOT cells, the groups of first 4 NBIOT cells, or the group of first 5 NBIOT cells.

Figure 6:
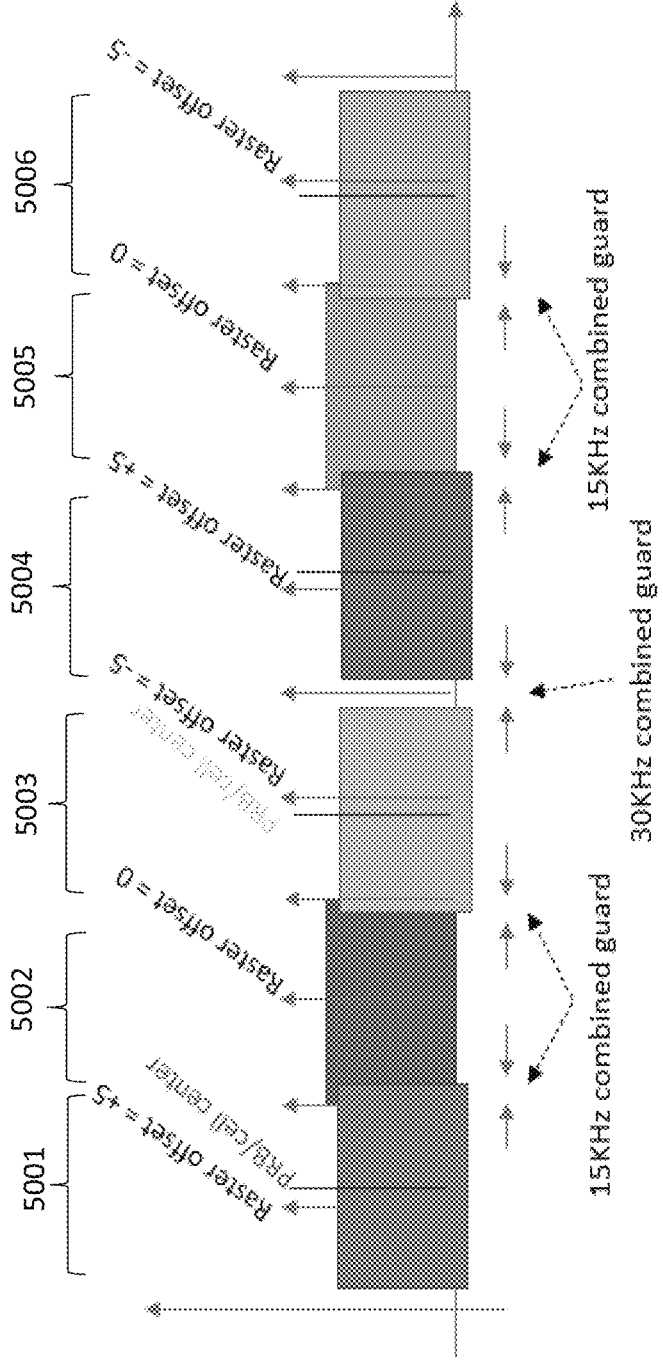
FIG. 6 is a diagram illustrating the combined guard regions between consecutive NBIOT cells shown in FIG. 5.

FIG. 6 is a diagram illustrating the combined guard regions among the consecutive NBIOT cells 5001-5006 shown in FIG. 5. As shown in FIG. 6, the following are provided as combined guard regions: i) 15 Khz combined guard region between NBIOT cells 5001 and 5002; ii) 15 Khz combined guard region between NBIOT cells 5002 and 5003; iii) 30 Khz combined guard region between NBIOT cells 5003 and 5004; iv) 15 Khz combined guard region between NBIOT cells 5004 and 5005; and v) 15 Khz combined guard region between NBIOT cells 5005 and 5006.

Figure 7:
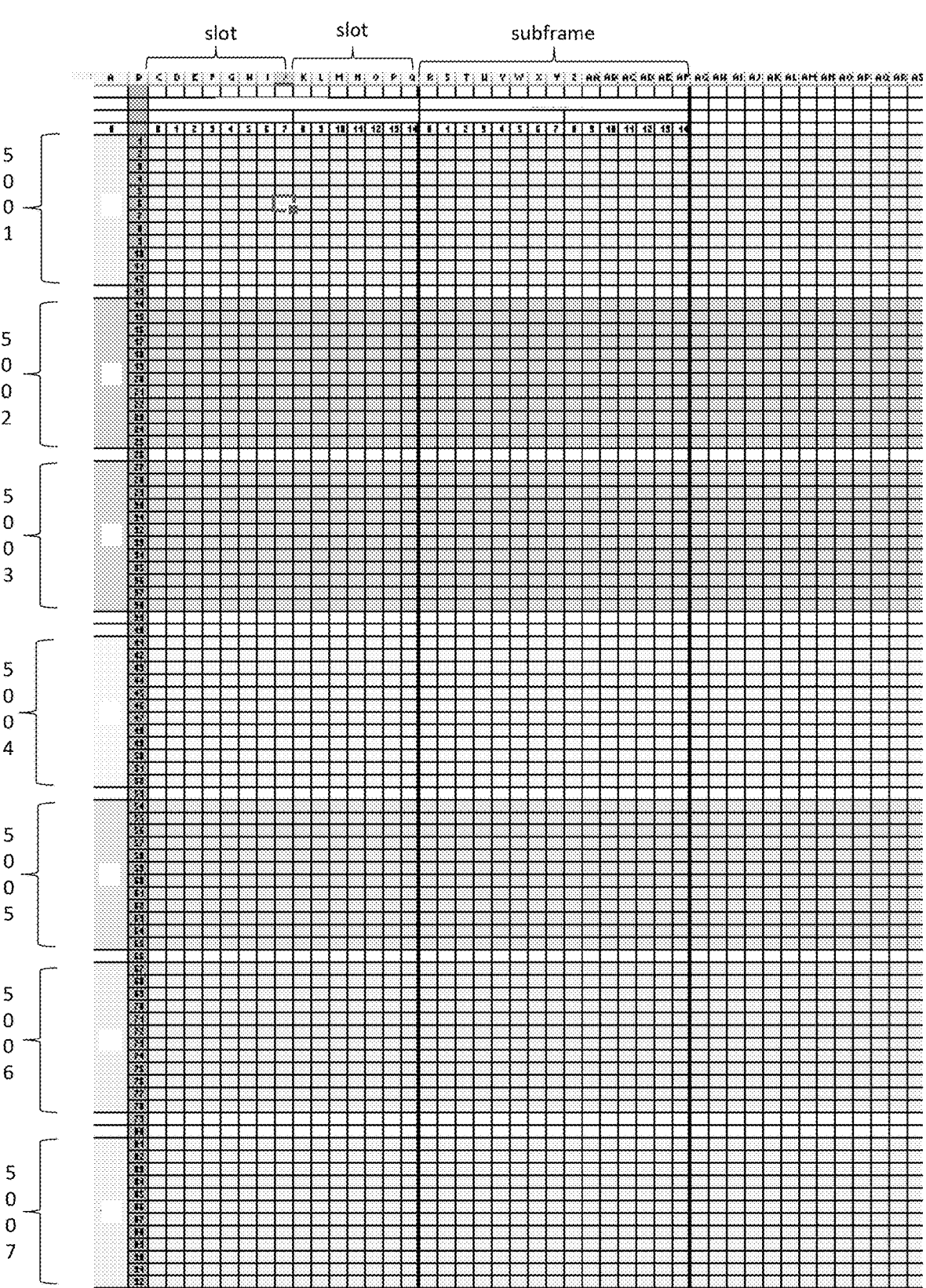
FIG. 7 illustrates a resource grid for 7 consecutive NBIOT standalone cells, which resource grid encompasses the configuration shown in FIG. 6.

FIG. 7 illustrates a combined resource grid for 7 consecutive NBIOT standalone cells, which resource grid encompasses the configuration shown in FIG. 6. Referenced on the left side of FIG. 7 are the NBIOT standalone cells 5001-5007, each cell containing 12 utilized subcarriers (shaded), and the combined guard regions (shown unshaded) between adjacent NBIOT standalone cells. In FIG. 7, the 13th row (unshaded) from the top corresponds to the 15 KHZ combined guard region between NBIOT standalone cells 5001 and 5002; the 26th row (unshaded) from the top corresponds to the 15 KHZ combined guard region between NBIOT standalone cells 5002 and 50032; etc. Shown on top of the FIG. 7 are the divisions for individual slots and subframes, with each subframe containing two slots, and each slot containing multiple (e.g., 7) symbols. A resource block (RB), which is the smallest unit of resource that is allocated to a user, is 180 kHz wide (12 subcarriers, each 15 KHz) in frequency and 1 slot long in time.

In order to accommodate and/or support the novel technique presented in the present disclosure, 3rd Generation Partnership Project (3GPP) Technical Specification (TS) 36.331 can be modified, e.g., as follows:

i) ChannelRasterOffset-NB information element can be enhanced by adding the following additional components (underlined):
-- ASN1START
ChannelRasterOffset-NB-r13 ::= ENUMERATED {khz-7dot5, khz-5, khz-2dot5, khzzero, khz2dot5, khz5, khz7dot5}
ii) MasterInformationBlock-NB element can be enhanced by adding the following additional components (underlined):
MasterInformationBlock-NB –> Standalone-NB-r13
Standalone-NB-r13 ::= SEQUENCE {
rasterOffset-r13 ChannelRasterOffset-NB-r13,
spare BIT STRING (SIZE (5))
}

Figure 8:
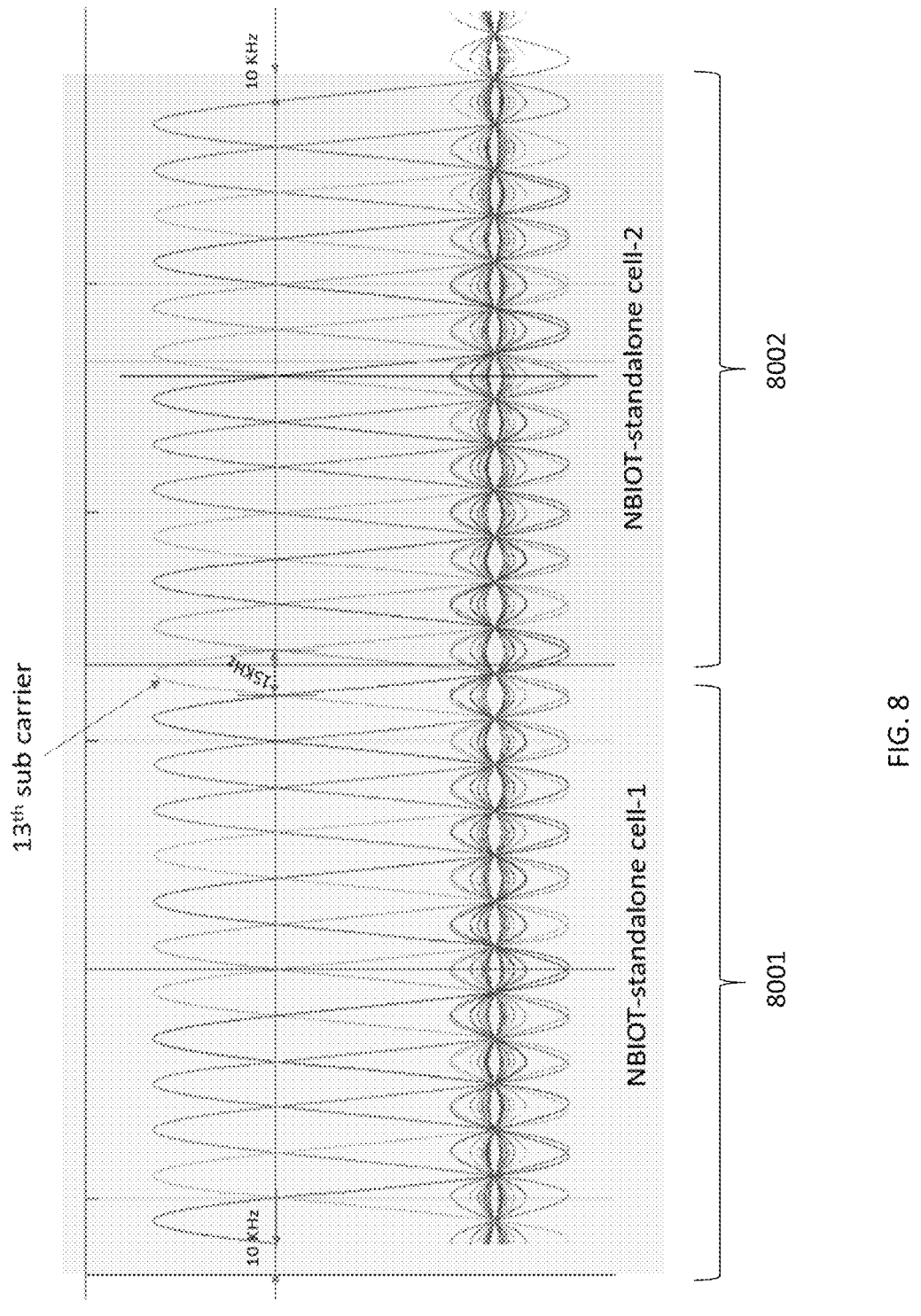
FIG. 8 is a diagram illustrating an example embodiment of two consecutive NBIOT standalone cells for which an extra subcarrier in the common (or combined) guard region is utilized.
Figure 9:
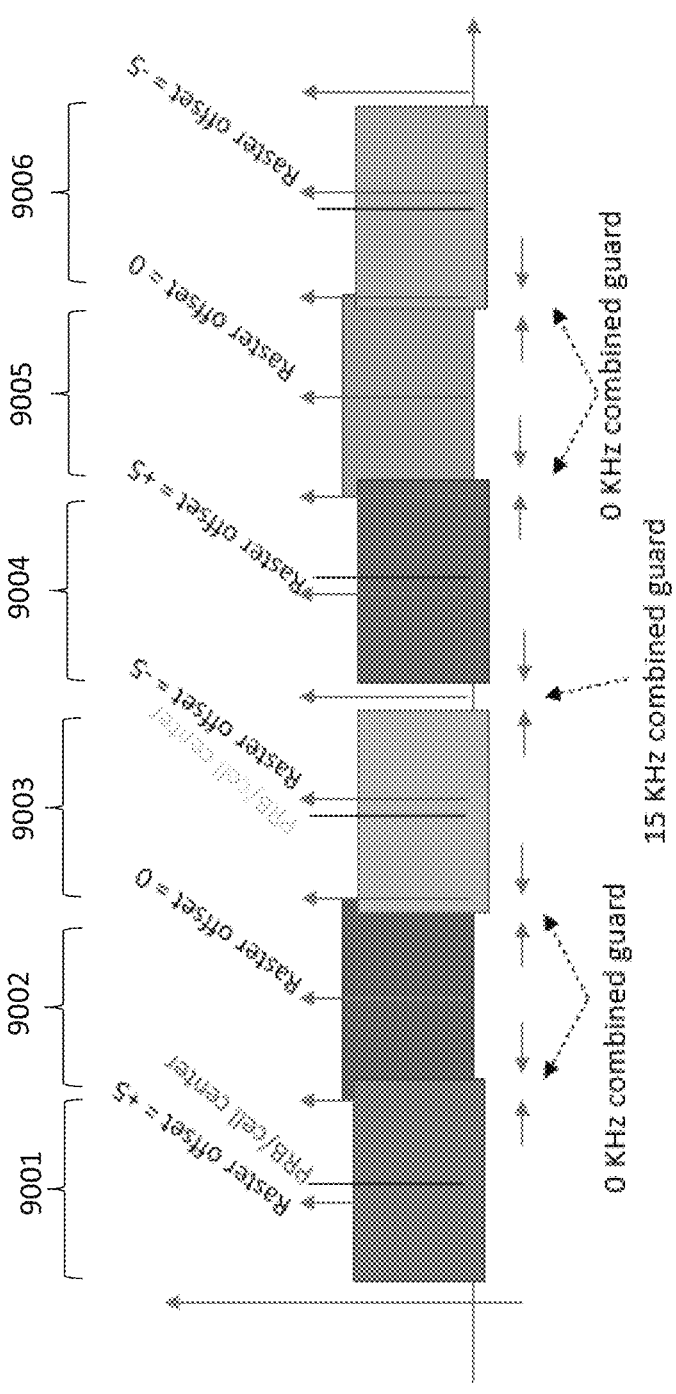
FIG. 9 is a diagram illustrating the combined guard regions in a sequence of six consecutive NBIOT cells for which an extra subcarrier in each combined guard region is utilized.

In the example embodiment illustrated in FIGS. 5-7, there is no cross interference among NBIOT standalone cells, and all the NBIOT standalone cells can be handled with the same FFT/iFFT. In this scenario, the combined (common) guard region between two NBIOT standalone cells can be utilized for an extra subcarrier (i.e., a 13th subcarrier). FIG. 8 illustrates an example embodiment of the 13th subcarrier in the combined (common) guard region between two NBIOT standalone cells 8001 and 8002. FIG. 9 illustrates the combined guard regions between adjacent NBIOT cells in the example case of using 13 sub carriers in NBIOT standalone cells. As shown in FIG. 9, the following configurations are provided for the sequence of six NBIOT cells 9001-9006: i) zero KHz combined guard region between NBIOT cells 9001 and 9002; ii) zero KHz combined guard region between NBIOT cells 9002 and 9003; iii) 15 KHz combined guard region between NBIOT cells 9003 and 9004; iv) zero KHz combined guard region between NBIOT cells 9004 and 9005; and v) zero KHz combined guard region between NBIOT cells 9005 and 9006. The raster offsets for the configuration shown in FIG. 9 correspond to the raster offsets shown in FIGS. 5 and 6, i.e., NBIOT cells 9002 and 9005 are placed with 0 raster offset; NBIOT cells 9001 and 9004 are placed with +5 KHz raster offset; and NBIOT cells 9003 and 9006 are placed with −5 KHz raster offset.

Figure 10:
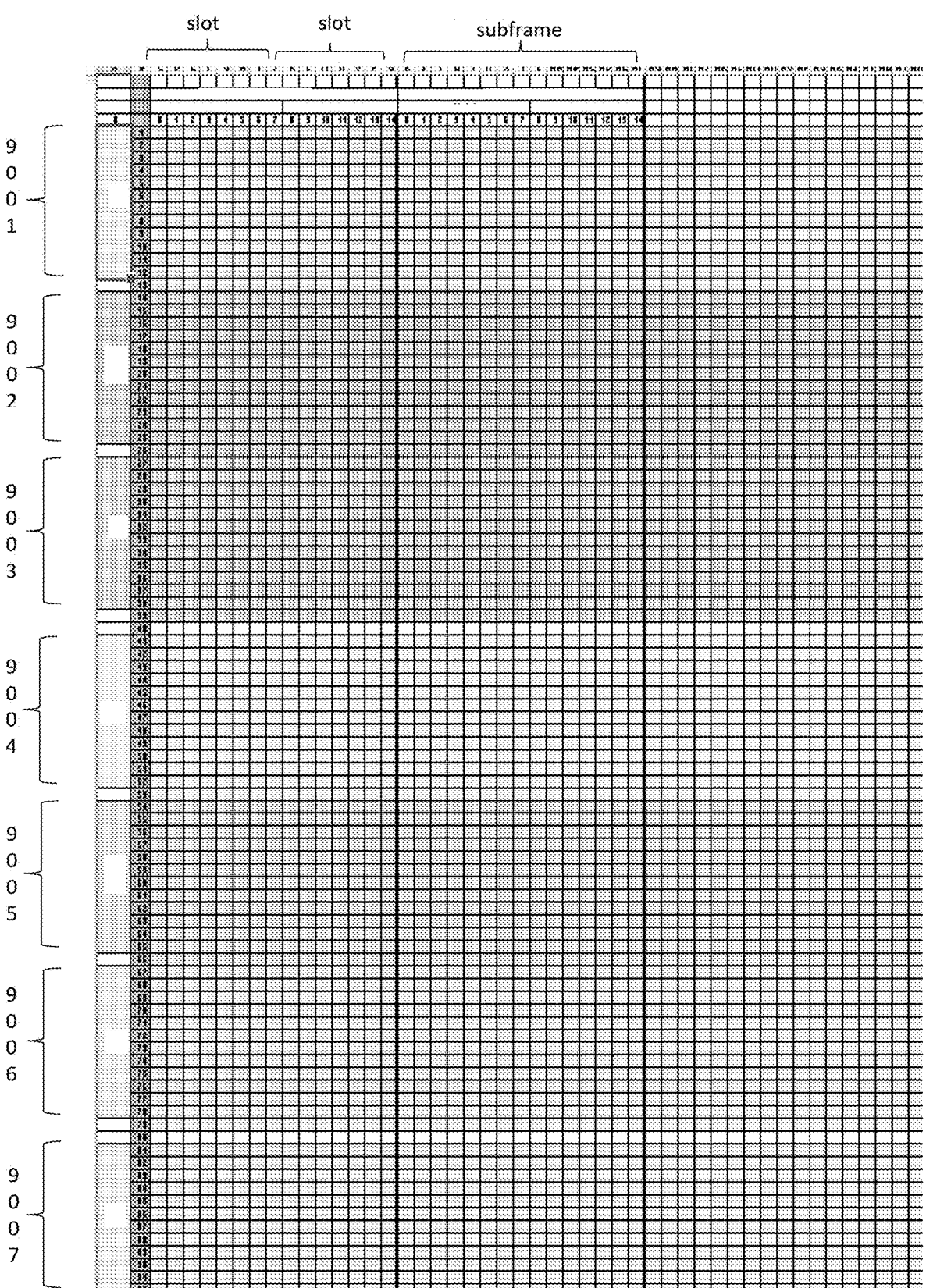
FIG. 10 illustrates a resource grid for 7 consecutive NBIOT standalone cells, which resource grid encompasses the configuration shown in FIG. 9.

FIG. 10 illustrates a resource grid for 7 consecutive NBIOT standalone cells, which resource grid encompasses the configuration shown in FIG. 9. In comparison to the resource grid illustrated in FIG. 7, it can be seen in FIG. 10 that the combined guard regions among the NBIOT cells 9001-9007 are utilized for subcarriers, with the exceptions of i) a 15 KHz band (unshaded) of the combined guard region between NBIOT cells 9003 and 9004, and ii) a 15 KHz band (unshaded) of the combined guard region between NBIOT cells 9006 and 9007.

Figure 11:
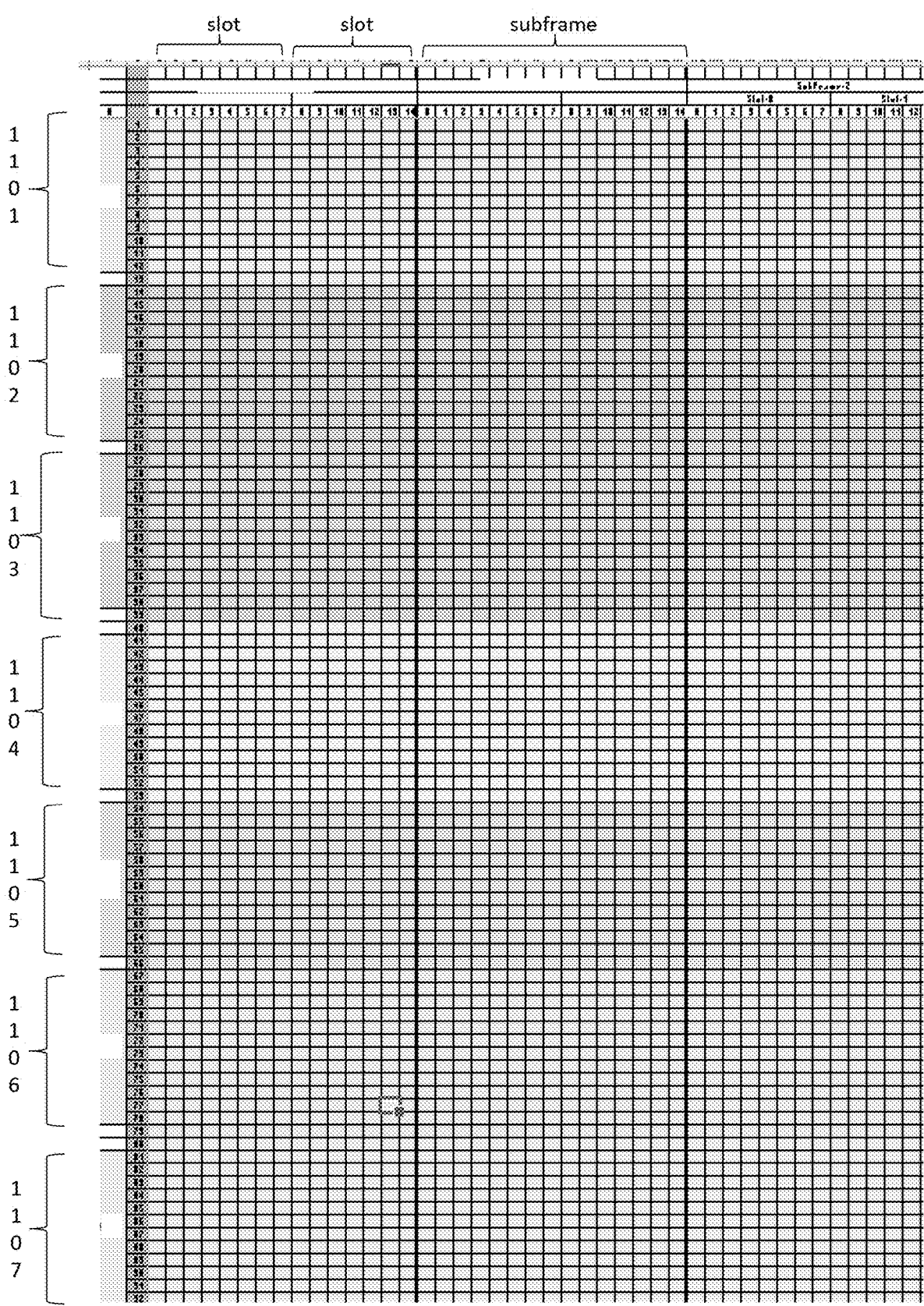
FIG. 11 illustrates a resource grid for 7 consecutive NBIOT standalone cells, which resource grid deviates from the resource grid shown in FIG. 10 by the additional inclusion of one further subcarrier for every third NBIOT standalone cell.

Given that one subcarrier is unused every 3 NBIOT cells in the example configuration shown in FIGS. 9 and 10, there is a possibility of deploying the unused subcarrier as a further subcarrier (i.e., 14th subcarrier) for an NBIOT cell. An example embodiment of a configuration in which a 14th subcarrier is utilized for one or more NBIOT cell(s) is illustrated in FIG. 11. FIG. 11 shows a resource grid for 7 consecutive NBIOT standalone cells 1101-1107, which resource grid deviates from the resource grid shown in FIG. 10 by the additional inclusion of one further (i.e., 14th) subcarrier for NBIOT cell 1104 and 1107. It should be noted that the 14th subcarrier can be assigned to either one of the adjacent NBIOT cells, e.g., NBIOT cells 1103 and 1106 could have been assigned the 14th subcarrier.

Figure 12:
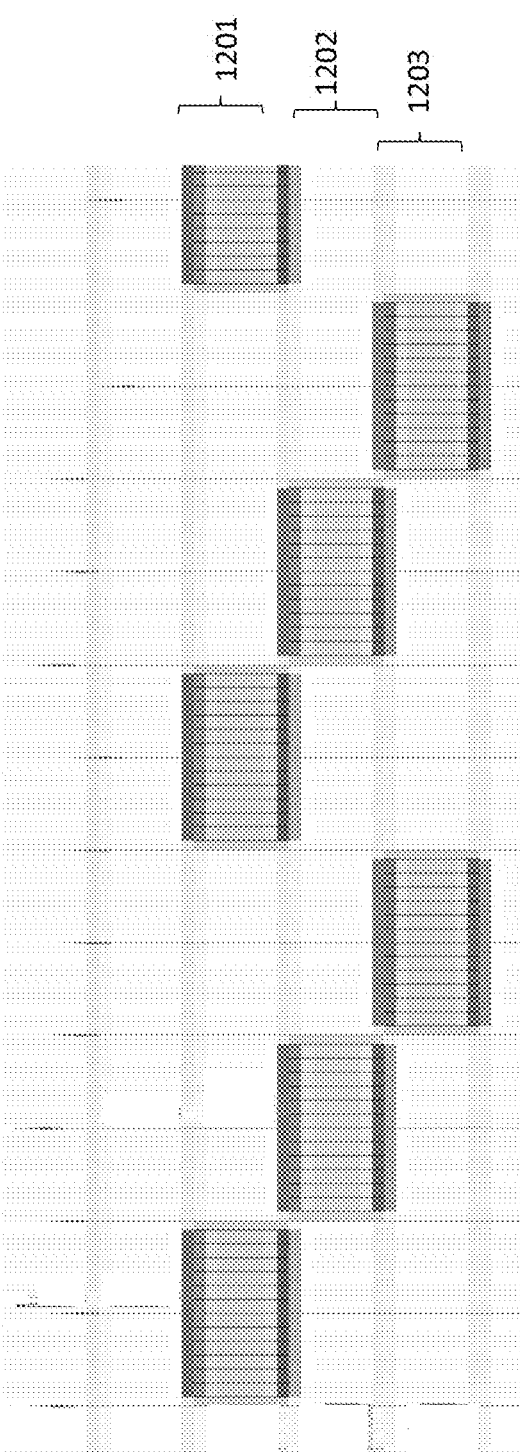
FIG. 12 is a diagram illustrating an example embodiment in which the same FFT/iFFT is used by the RAN for processing every third NBIOT standalone cell in a sequence of consecutive NBIOT cells.

According to an example embodiment of the present disclosure, a method is presented in which the same fast Fourier transform (FFT) and/or corresponding inverse fast Fourier transform (iFFT) is used by the RAN for processing every third NBIOT standalone cell in a sequence of consecutive NBIOT cells. All NBIOT standalone cells occupy 200 KHz, and subcarriers in every 3rd NBIOT cell are orthogonal to each other, i.e., align to the same grid, which means it is possible to use the same FFT/iFFT for every 3rd NBIOT cell. In this example embodiment, which is illustrated in FIG. 12, at least one of the following configurations is provided for a sequence of NBIOT standalone cells sequentially positioned starting on the left: i) a first set of NBIOT standalone cells (referenced by 1201 in FIG. 12) having sequence position numbers with quotient-1 of modulo-3 operation is processed by the RAN using at least one of a first FFT and a corresponding first iFFT; ii) a second set of NBIOT standalone cells (referenced by 1202 in FIG. 12) having sequence position numbers with quotient-2 of modulo-3 operation is processed by the RAN using at least one of a second FFT and a corresponding second iFFT; and/or iii) a third set of NBIOT standalone cells (referenced by 1203 in FIG. 12) having sequence position numbers with quotient-0 of modulo-3 operation is processed by the RAN using at least one of a third FFT and a corresponding third iFFT.

The invention claimed is:

1. A method of processing multiple consecutive Narrowband Internet of Things (NBIOT) cells by a Radio Access Network (RAN) for one of 4G or 5G mobile network, the method comprising:
   one of:

a) 1) at least one first NBIOT cell is shifted relative to an adjacent second NBIOT cell to align all sub carriers of the first and second NBIOT cells to be mutually orthogonal; and 2) using a first single fast Fourier transform (FFT) or first single inverse fast Fourier transform (iFFT) by the RAN to process both the first and second NBIOT cells; or b) 1) for a sequence of NBIOT cells, every third NBIOT cell is grouped into a single group, wherein all sub carriers of the NBIOT cells in the single group are mutually orthogonal; and 2) using the first single FFT or the first single iFFT by the RAN to process multiple NBIOT cells in the single group formed from the every third NBIOT cell;

wherein:

the at least one first NBIOT cell is shifted relative to an adjacent second NBIOT cell by 5 KHz to align all sub carriers of the first and second NBIOT cells to be mutually orthogonal;

a third NBIOT cell adjacent to the second NBIOT cell is provided;

the at least one first NBIOT cell is right-shifted relative to the second NBIOT cell by 5 KHz, and the third NBIOT cell is left-shifted relative to the second NBIOT cell by 5 KHz;

a fourth NBIOT cell adjacent to the third NBIOT cell is provided;

a 30 KHz common guard region is provided between the third NBIOT cell and the fourth NBIOT cell;

a first extra subcarrier provided in the 30 Khz common guard region between the third NBIOT cell and the fourth NBIOT cell is utilized; and a second extra subcarrier provided in the 30 Khz common guard region between the third NBIOT cell and the fourth NBIOT cell is utilized as a part of the fourth NBIOT cell.

2. A method of processing multiple consecutive Narrowband Internet of Things (NBIOT) cells by a Radio Access Network (RAN) for one of 4G or 5G mobile network, the method comprising:

one of:

c) 1) at least one first NBIOT cell is shifted relative to an adjacent second NBIOT cell to align all sub carriers of the first and second NBIOT cells to be mutually orthogonal; and 2) using a first single fast Fourier transform (FFT) or first single inverse fast Fourier transform (iFFT) by the RAN to process both the first and second NBIOT cells; or d) 1) for a sequence of NBIOT cells, every third NBIOT cell is grouped into a single group, wherein all sub carriers of the NBIOT cells in the single group are mutually orthogonal; and 2) using the first single FFT or the first single iFFT by the RAN to process multiple NBIOT cells in the single group formed from the every third NBIOT cell;

wherein:

the at least one first NBIOT cell is shifted relative to an adjacent second NBIOT cell by 5 KHz to align all sub carriers of the first and second NBIOT cells to be mutually orthogonal;

a third NBIOT cell adjacent to the second NBIOT cell is provided;

the at least one first NBIOT cell is right-shifted relative to the second NBIOT cell by 5 KHz, and the third NBIOT cell is left-shifted relative to the second NBIOT cell by 5 KHz;

a fourth NBIOT cell adjacent to the third NBIOT cell is provided;

a 30 KHz common guard region is provided between the third NBIOT cell and the fourth NBIOT cell;

a fifth NBIOT cell adjacent to the fourth NBIOT cell is provided;

the fourth NBIOT cell is right-shifted relative to the fifth NBIOT cell by 5 KHz;

a 15 KHz common guard region is provided between the fourth NBIOT cell and the fifth NBIOT cell; and an extra subcarrier provided in the 15 Khz common guard region between the fourth NBIOT cell and the fifth NBIOT cell is utilized as a part of the fourth NBIOT cell.

3. A method of processing multiple consecutive Narrowband Internet of Things (NBIOT) cells by a Radio Access Network (RAN) for one of 4G or 5G mobile network, the method comprising:

one of:

a) 1) at least one first NBIOT cell is shifted relative to an adjacent second NBIOT cell to align all sub carriers of the first and second NBIOT cells to be mutually orthogonal; and 2) using a first single fast Fourier transform (FFT) or first single inverse fast Fourier transform (iFFT) by the RAN to process both the first and second NBIOT cells; or b) 1) for a sequence of NBIOT cells, every third NBIOT cell is grouped into a single group, wherein all sub carriers of the NBIOT cells in the single group are mutually orthogonal; and 2) using the first single FFT or the first single iFFT by the RAN to process multiple NBIOT cells in the single group formed from the every third NBIOT cell;

wherein:

the at least one first NBIOT cell is shifted relative to an adjacent second NBIOT cell by 5 KHz to align all sub carriers of the first and second NBIOT cells to be mutually orthogonal;

a third NBIOT cell adjacent to the second NBIOT cell is provided;

the at least one first NBIOT cell is right-shifted relative to the second NBIOT cell by 5 KHz, and the third NBIOT cell is left-shifted relative to the second NBIOT cell by 5 KHz;

a fourth NBIOT cell adjacent to the third NBIOT cell is provided;

a 30 KHz common guard region is provided between the third NBIOT cell and the fourth NBIOT cell;

a first extra subcarrier provided in the 30 Khz common guard region between the third NBIOT cell and the fourth NBIOT cell is utilized;

a second extra subcarrier provided in the 30 Khz common guard region between the third NBIOT cell and the fourth NBIOT cell is utilized;

a fifth NBIOT cell adjacent to the fourth NBIOT cell is provided;

the fourth NBIOT cell is right-shifted relative to the fifth NBIOT cell by 5 KHz;

a 15 KHz common guard region is provided between the fourth NBIOT cell and the fifth NBIOT cell; and an extra subcarrier provided in the 15 Khz common guard region between the fourth NBIOT cell and the fifth NBIOT cell is utilized as a part of the fourth NBIOT cell.

4. A method of processing multiple consecutive Narrowband Internet of Things (NBIOT) cells by a Radio Access Network (RAN) for one of 4G or 5G mobile network, the method comprising:

one of:

a) 1) at least one first NBIOT cell is shifted relative to an adjacent second NBIOT cell to align all sub carriers of the first and second NBIOT cells to be mutually orthogonal; and 2) using a first single fast Fourier transform (FFT) or first single inverse fast Fourier transform (iFFT) by the RAN to process both the first and second NBIOT cells; or b) 1) for a sequence of NBIOT cells, every third NBIOT cell is grouped into a single group, wherein all sub carriers of the NBIOT cells in the single group are mutually orthogonal; and 2) using the first single FFT or the first single iFFT by the RAN to process multiple NBIOT cells in the single group formed from the every third NBIOT cell;

wherein:

for a sequence of NBIOT cells, every third NBIOT cell is grouped into a single group, and all sub carriers of the NBIOT cells in the single group are mutually orthogonal; and at least one of the following configurations is provided for the sequence of NBIOT cells sequentially positioned: i) a first set of NBIOT standalone cells having sequence position numbers with quotient-1 of modulo-3 operation is processed by the RAN using at least one of a first FFT and a corresponding first iFFT; ii) a second set of NBIOT standalone cells having sequence position numbers with quotient-2 of modulo-3 operation is processed by the RAN using at least one of a second FFT and a corresponding second iFFT; and iii) a third set of NBIOT standalone cells having sequence position numbers with quotient-0 of modulo-3 operation is processed by the RAN using at least one of a third FFT and a corresponding third iFFT.

* * * * *